United States Patent [19]
Herter et al.

[11] 3,729,282
[45] Apr. 24, 1973

[54] APPARATUS FOR RADIALLY EXPANDING THE END PORTION OF A TUBE MODE OF THERMOPLASTIC SYNTHETIC MATERIAL

[75] Inventors: Hermann Herter, Krefeld; Adolf Scherf, Duisburg, both of Germany

[73] Assignee: Mannesmann Aktiengesellschaft, Mannesmannufer, Germany

[22] Filed: June 1, 1971

[21] Appl. No.: 148,973

[30] Foreign Application Priority Data

Oct. 24, 1968 Germany..................P 18 05 597.5

[52] U.S. Cl. ..............425/393, 249/63, 249/177, 249/184, 425/468
[51] Int. Cl. .................B29c 17/00, B29c 23/00
[58] Field of Search .................18/19 TE, 45 R; 249/180, 179, 181, 186; 425/393

[56] References Cited

UNITED STATES PATENTS

| | | | |
|---|---|---|---|
| 199,179 | 1/1878 | Bisset | 249/181 |
| 2,315,634 | 4/1943 | McCall | 249/179 |
| 3,031,365 | 4/1962 | Marchioli et al. | 18/19 TE X |
| 3,248,756 | 5/1966 | Mills et al. | 18/19 TE |
| 3,339,242 | 9/1967 | Lamb | 249/180 UX |
| 3,482,815 | 12/1969 | Naturale | 249/180 |
| 3,553,780 | 1/1971 | Kuhlemann | 18/19 TE |
| 3,247,548 | 4/1966 | Fields et al. | 18/45 R X |

*Primary Examiner*—J. Howard Flint, Jr.
*Attorney*—Ernest F. Marmorek

[57] ABSTRACT

Means for radially expanding the end portion of a tube made of thermoplastic synthetic material provides for a mandrel having a cylindrical sheath which is longitudinally divided into a plurality of sections. Each sections is at the outer end thereof connected through a radial rod with a radial drive. The sections are collapsible inwardly towards the longitudinal axis of the tube portion. In the collapsed position the sheath sections together with the rods and drive are moved towards the tube end. By radially moving the segments into a closed position, the tube end is shaped to the desired configuration.

4 Claims, 8 Drawing Figures

Patented April 24, 1973
3,729,282
3 Sheets-Sheet 1
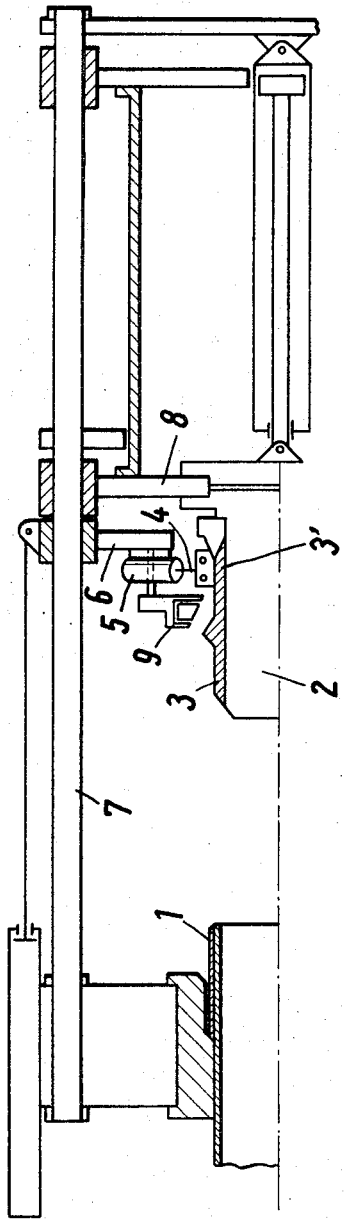
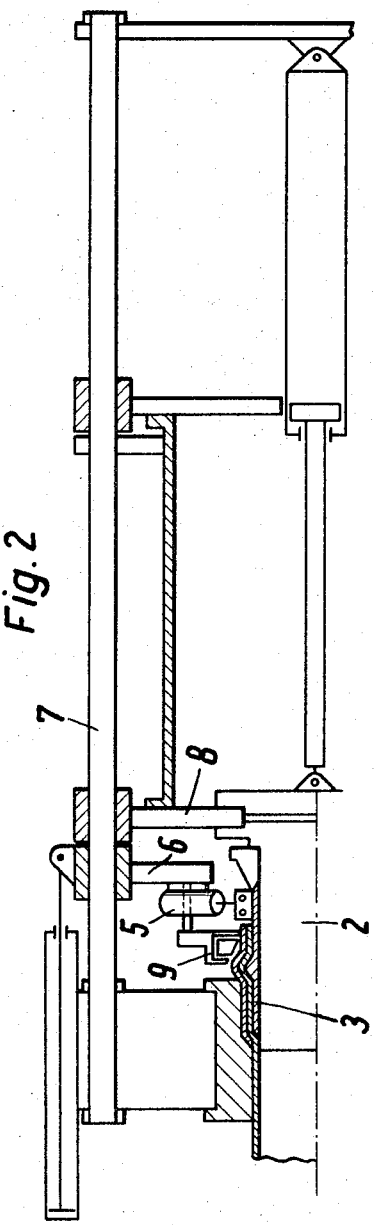
Inventors:
Hermann Herter and
Adolf Scherf,
By Ernest A. Marmorek,
Their Attorney.

Patented April 24, 1973
3,729,282
3 Sheets-Sheet 2
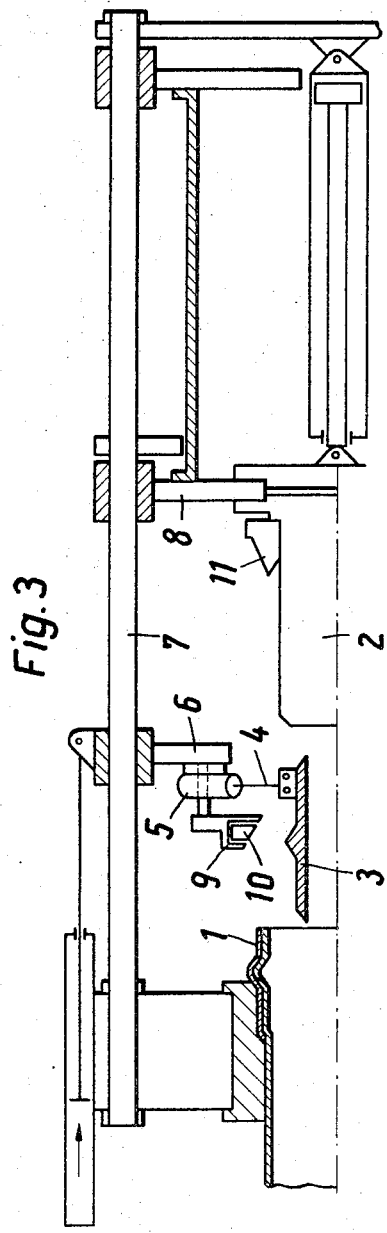
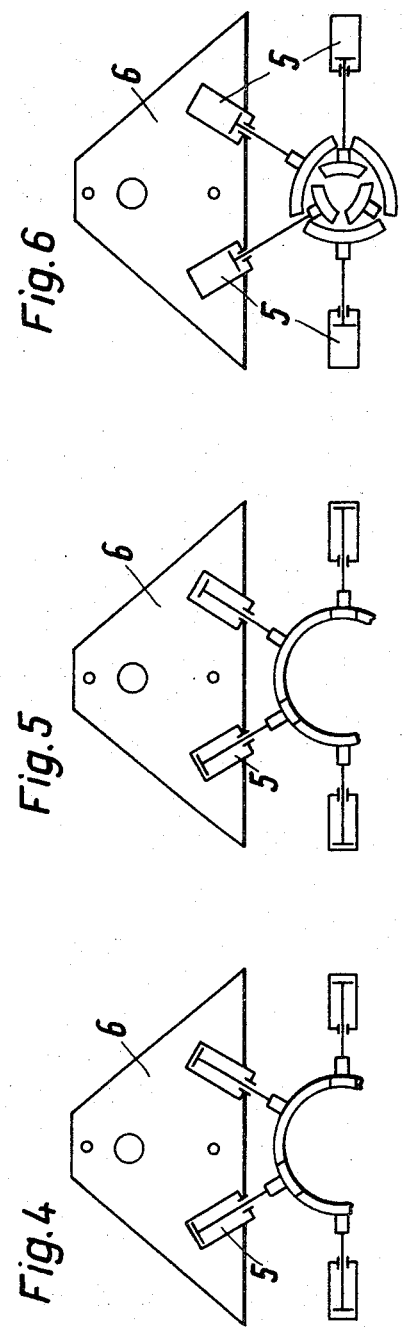
Inventors:
Hermann Herter
and Adolf Scherf,
By their Attorney.

Inventors:
Hermann Herter
and
Adolf Scherf,
By *Their Attorney.*

APPARATUS FOR RADIALLY EXPANDING THE END PORTION OF A TUBE MODE OF THERMOPLASTIC SYNTHETIC MATERIAL

The present invention relates to an apparatus for forming a sleeve having expanded annular portions onto the end of a tube made of thermoplastic synthetic material.

The invention is a further development of an apparatus as disclosed, for example, in the German Pat. No. 1,172,418 wherein the end of a tube, onto which a sleeve must be formed, is heated, whereafter a mandrel composed of a plurality of individual parts and shaped corresponding to the final shape of the interior of the sleeve is forced, in assembled condition, into the tube end in axial direction and, after cooling of the tube end, is taken apart and removed from the sleeve. The mandrel comprises a cylindrical core and a sheath therearound which sheath is composed of several segments and adapted to be axially stripped off the core.

It is an object of the present invention to provide an apparatus for forming a sleeve at the end of a tube made of thermoplastic material which apparatus affords speedier operation, require less space and is better suited for automatic operation than conventional apparatus.

The aforestated object is obtained by radially moving sheath segments onto a core for forming a mandrel which is axially inserted into the tube end which must be expanded to form a sleeve, by axially withdrawing the core after the sleeve has been formed, by radially moving the sheath segments toward the center line of the tube end, extracting the thus moved-together segments from the tube end, and placing the segments on the surface of the cylindrical core for assembling the mandrel for the subsequent sleeve forming operation.

In a preferred embodiment of the invention two groups of core sheath segments are provided whereby, when the mandrel is assembled, the segments of one group are circumferentially interspersed between the segments of the second group, and the segments of one group, after removal of the core and radial movement of the segments into the interior of the tube end, are nested within the segments of the second group.

The circumferential extension of the core sheath segments of one group is preferably smaller than that of the segments of the second group. The surfaces of the segments of smaller circumferential extension, which surfaces are adjacent surfaces of the segments of larger circumferential extension, taper toward the outside. The ends of the segments, which ends are away from the tube end to be worked, are individually connected to rods which are operatively connected to elements, for example pistons, of hydraulic or pneumatic devices for radially moving the segments. These elements are arranged on a support, for example a base plate, which is axially movable. If there is not enough clearance between the moved-together larger elements for accommodating the actuating rods of the smaller segments, suitable recesses may be provided at the rear ends of the larger segments for affording passage of the rods of the smaller segments.

All movements are controlled by limit switches. The division and direction of movement of the core sheath segments are so arranged that, after removal of the core, at first the segments having outwardly tapered surfaces are radially moved toward the center line of the tube end, whereafter the other segments are radially moved toward the center line of the tube end. The tapered surfaces of the segments facilitate radial withdrawal of the segments of one group which are considerably pressed against the segments of the other group due to shrinking of the sleeve which is made of synthetic material. The arrangement of the hydraulic or pneumatic devices on an axially movable common base plate affords simultaneous withdrawal of the segments which have been moved closely together to form a package. The mandrel can be reassembled by moving the segments apart after withdrawal from the tube end, in a sequence opposite that in which the segments were moved together when the core sheath was disassembled whereafter the segments, which now form a cylinder, are moved onto the core of the mandrel and firmly pressed thereunto, effecting good heat transfer from the core to the sheath.

The novel features which are considered characteristic of the invention are set forth with particularity in the appended claims. The invention itself, however, and additional objects and advantages thereof will best be understood from the following description of an embodiment thereof when read in connection with the accompanying drawing, wherein:

FIGS. 1 to 3 are part sectional schematic side elevations of an arrangement according to the invention, in three different operating positions;

FIGS. 4 to 6 are schematic part sectional views of the arrangement according to the invention in the positions wherein the arrangement is shown in FIGS. 1 to 3, respectively;

Figure 8:
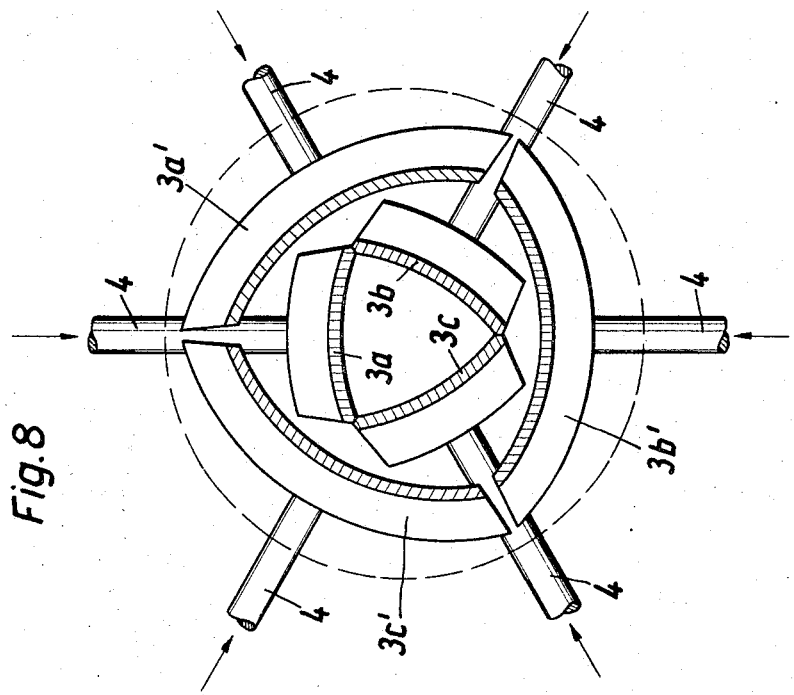
FIG. 8 is a sectional view similar to FIG. 7, but with the sheath sections in a different operating position.

Referring more particularly to FIG. 1 of the drawings, the end portion 1, of a heated tube to be worked, is shown in position to be operated on. A mandrel for expanding the tube end portion 1 comprises a core 2 formed as a hollow body and a plurality of core sheath segments 3 placed therearound. The mandrel is shown in a position outside of the tube end 1. The rear ends 3' of the core sheath segments 3 are individually connected, by means of rods 4, to pistons in cylinders 5. These pistons may be hydraulically or pneumatically actuated. The cylinders 5 are mounted on a base plate or support 6 which is axially movable on spars 7. The core 2 is also axially movably connected to the spars 7 by means of a plate or the like 8.

FIG. 2 shows the core 2 with the core sheath segments 3, moved by means of the base plate 6 on the spars 7 into the tube end 1 to be worked.

When forming the annularly expanded sleeve on the tube end 1, a device 12 on the left side (FIG. 2) serves as a countersupport, whereas at the right side (FIG. 2) of the sleeve several countersupports 9 are distributed on the plate 6 around the longitudinal axis of the tube end. The countersupports 9 may be constructed, for example, similar to a rim on a wheel whereon an inflatable rubber tube 10 or the like is mounted which is pressed against the tube end 1 for forming the sleeve.

An annular axial movement limiting and centering ring 11 is arranged at the right side of the core 2 (FIG. 3), which ring facilitates placement of the core sheath segments 3 and prevents displacement of the core sheath segments.

FIG. 3 shows the core sheath segments 3 moved axially out of the worked tube end and moved radially toward the center line or longitudinal axis of the arrangement into cooling position between the finished tube end 1 and the core 2 which has been moved to the extreme right.

Figure 7:
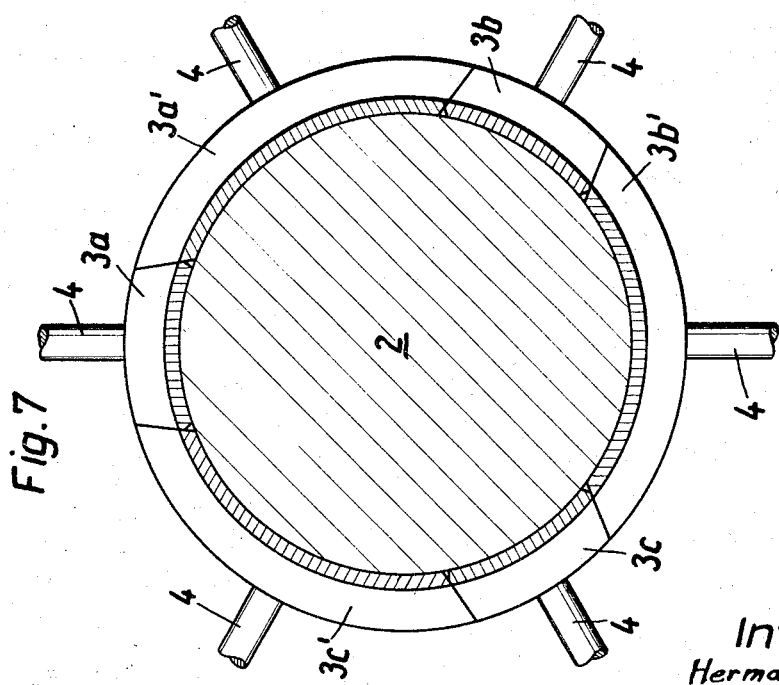
FIG. 7 is a large scale fragmentary part sectional view of a portion of an arrangement according to the invention, showing core sheath segments placed around a mandrel core.

Position, movement and configuration of the core sheath elements 3 are more clearly shown in FIGS. 7 and 8. There is a group of elements 3a, 3b, 3c where peripheral extension is smaller than that of elements 3a', 3b', 3c'. The segments 3a, 3b, 3c whose peripheral extension is smaller, have lateral surfaces which taper toward the outside. These surfaces individually abut against corresponding surfaces of the segments whose peripheral extensions are larger.

Numeral 4 designates connecting rods of which there is one for each core sheath segment.

FIG. 7 shows all segments adjacent the core 2 and forming a sheath therearound.

In FIG. 8 the segments are shown in inwardly moved position, after removal of the core 2. The segments 3a, 3b, 3c are inside the segments 3a', 3b' and 3c', the latter being placed inside the inside diameter of the tube end 1. The segments thus form a cluster which can easily be removed in axial direction from the shaped tube end portion 1.

The mandrel 2, 3 forms a hollow body which is connected to conduits, not shown, for supplying and removing a heating agent, for example steam, and a coolant, for example water.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. An apparatus for outwardly expanding a portion of a tube made of a thermoplastic, comprising
   a mandrel insertable into the tube end portion and including a cylindrical core and a sheath normally surrounding said core, said core being axially removable from said sheath, said sheath being divided into at least two groups of segments each segment having an inner surface normally tightly disposed on an upper end part of said core, said segments having lateral surfaces abutting one another when said segments are in sheath forming position, the outer surface of the segments forming the sheath including a peripheral wedge tapered radially outwardly, the segments of one group being interspersed between the segments of the second group when both of said groups of segments are in said sheath forming position, the segments of one group being disposed inside the second group, a plurality of rods each being individually driven and connected to one of said segments for oppositely radially moving said segments inwardly towards the longitudinal axis of the tube portion for placing said segments closely together to form a cluster when said core is removed, and, respectively, for radially moving said segments away from longitudinal axis of the tube end portion to form a closed sheath for said core, axial moving means, said core, sheath and rods being connected to said axial moving means, said axial moving means moving said cluster of segments in and out of said tube portion, said rods moving said segments into position forming a closed sheath onto said core for assembling said mandrel for the subsequent expanding operation.

2. An apparatus according to claim 1 further comprising
   elongated guiding means arranged substantially parallel to said portion of said tube to be expanded,
   a first moving plate slidably supported on said guiding means and supporting said rods, and
   a second moving plate slidably supported on said guiding means and connected to said core.

3. An apparatus for outwardly expanding a portion of a tube made of a deformable material, comprising, in combination,
   a mandrel removably insertable coaxially into said tube,
   said mandrel including a core and an expansion sheath removably disposed on said core,
   said sheath including segments radially movable to and from a sheath forming position and comprising at least two groups of such segments, the segments of the two groups alternating in the sheath forming position,
   each segment of one group having lateral surfaces diverging inwardly and each segment of the other group having lateral surfaces diverging outwardly, said lateral surfaces of the adjoining segments abutting one another when said segments are in sheath forming position,
   said core being movable to and from a position within said sheath,
   first axial drive means in driving connection with said core and operable for moving said core to and from said sheath,
   a plurality of radial drive means in driving connection with said segments and operable for radially displacing one group of segments in advance of the other group of segments when said core is axially displaced from said sheath,
   and second axial drive means coupled with said plurality of radial drive means and operable for inserting in concert with said first axial drive means said mandrel into said tube and for axially removing the radially inwardly displaced segments from the expanded portion of said tube.

4. An apparatus according to claim 3 further comprising die means abutting from the outside against said portion of the tube to be expanded and holding said tube in axial position against said axially movable mandrel.

* * * * *